United States Patent [19]

Ogata

[11] Patent Number: 4,544,970
[45] Date of Patent: Oct. 1, 1985

[54] ADAPTER FOR A MINIATURE TYPE TAPE CASSETTE

[75] Inventor: Haruki Ogata, Sagamihara, Japan

[73] Assignee: Victor Company of Japan, Ltd., Yokohama, Japan

[21] Appl. No.: 473,854

[22] Filed: Mar. 9, 1983

[30] Foreign Application Priority Data

Mar. 16, 1982 [JP] Japan .............................. 57-35921[U]

[51] Int. Cl.⁴ ............................................. G11B 15/66
[52] U.S. Cl. ..................... 360/94; 360/96.5; 360/132
[58] Field of Search .................. 360/94, 132, 85, 96.5; 242/199, 197

[56] References Cited

U.S. PATENT DOCUMENTS 4,477,850 10/1984 Ogata et al. ............................ 360/94
4,494,161 1/1985 Ogata et al. ....................... 360/94 X Primary Examiner—John H. Wolff
Attorney, Agent, or Firm—Louis Bernat

[57] ABSTRACT

An adapter for a miniature type tape cassette provided with an opening and closing lid, has an external form and size smaller than those of a standard type tape cassette, and comprises an adapter case having an external form and size substantially identical to those of a standard type tape cassette, an accommodating part for accommodating the miniature type tape cassette, a tape draw-out mechanism provided within the adapter case for drawing out a tape from the miniature type tape cassette so as to form a predetermined tape path within the adapter case, and a lid stopping member for stopping a lower surface of an open lid of the miniature type tape cassette accommodated within the accommodating part, at least at a substantially central part along a longitudinal direction of the lid.

10 Claims, 16 Drawing Figures

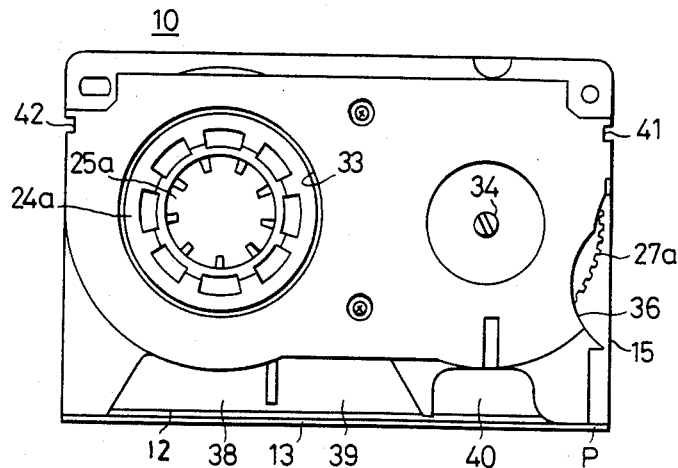
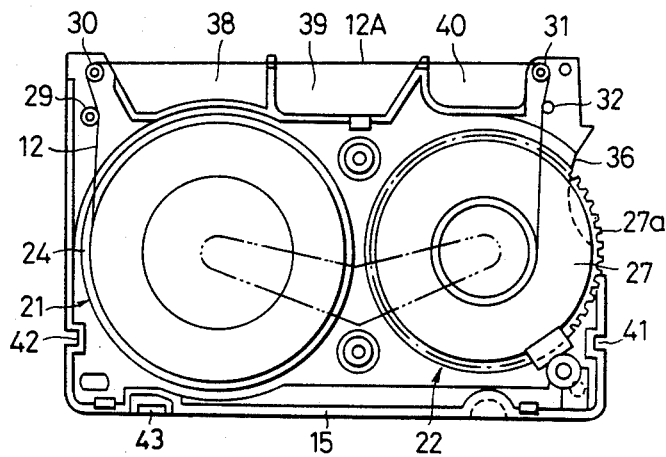
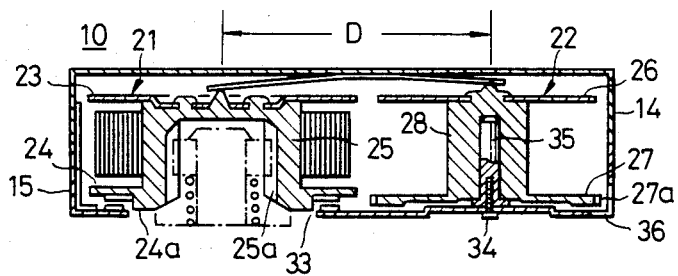

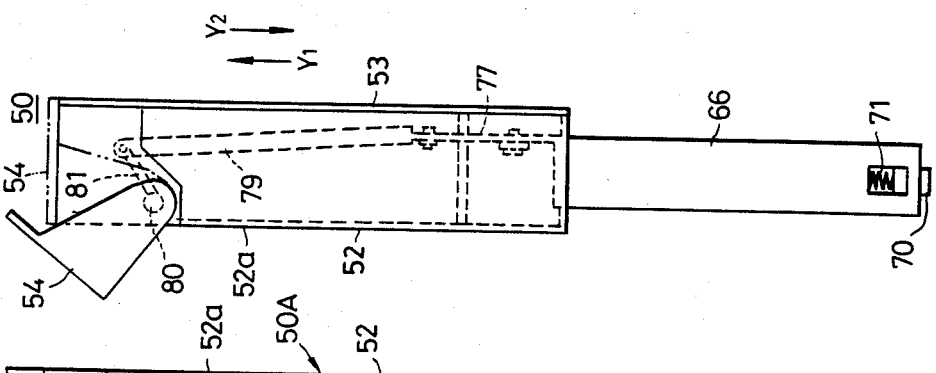
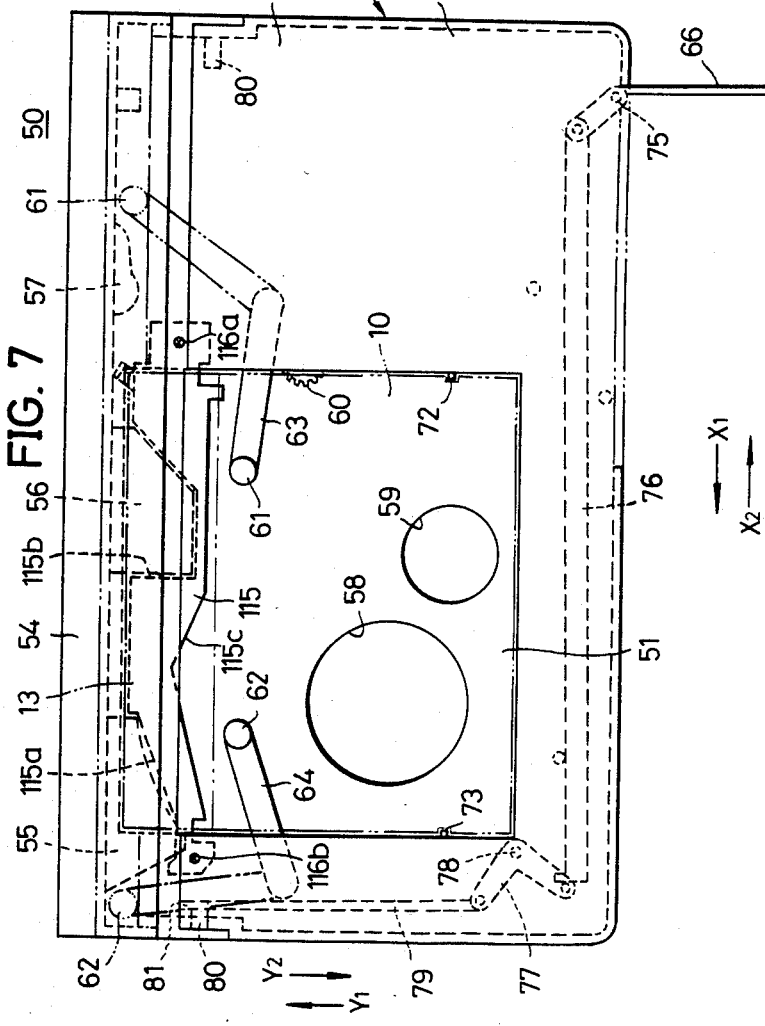

4,544,970

ADAPTER FOR A MINIATURE TYPE TAPE CASSETTE

BACKGROUND OF THE INVENTION

The present invention generally relates to adapters for miniature type tape cassettes, and more particularly to an adapter for use with a miniature type tape cassette which has a size smaller than a standard type tape cassette and is loaded independently into a recording and/or reproducing apparatus of a type different from a standard type recording and/or reproducing apparatus.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in downsizing the recording and/or reproducing apparatus main body. This is to develop a more compact portable type recording and/or reproducing apparatus, and, for example, to realize such an equipment that a recording apparatus is unitarily built into a television camera.

Accordingly, in order to downsize the recording and/or reproducing apparatus without changing the formats of the tape cassette and the recording and/or reproducing apparatus, a miniature type tape cassette was proposed in a U.S. patent application Ser. No. 322,174 entitled "MINIATURE TYPE TAPE CASSETTE" filed Nov. 17, 1981 in which the assignee is the same as that of the present application. This proposed miniature tape cassette has a size smaller than the standard type tape cassette, and is loaded independently into a recording and/or reproducing apparatus of a type different from the standard type recording and/or reproducing apparatus which carried out recording and reproduction when loaded with the standard type tape cassette. Further, an adapter for a miniature type tape cassette was proposed in a U.S. patent application Ser. No. 322,767 entitled "ADAPTER FOR A MINIATURE TYPE TAPE CASSETTE" filed Nov. 19, 1981 in which the assignee is the same as that of the present application. The proposed adapter has an external form and size identical to the standard type tape cassette. This proposed adapter is designed so as to accommodate the miniature type tape cassette therein, and is located into the standard type recording and/or reproducing apparatus in a state where a tape is drawn out of a cassette case of the miniature type tape cassette to form a predetermined tape path within the adapter.

As will be described in detail hereinafter, a lid which is free to open and close is provided at the front of the above described miniature type tape cassette. This lid is maintained in the open or closed position by a force exerted by a spring. The miniature type tape cassette is accommodated within the adapter in a state where the lid is open in a horizontal state.

In the conventional adapter for a miniature type tape cassette, no means are provided for stopping the lid of the miniature type tape cassette which is accommodated within the adapter. Hence, if an external force acts on the lid of the miniature type tape cassette in the closing direction of the lid, the lid will easily rotate towards its closing direction. Thus, there were disadvantages in that the lid might close due to such an external force to pinch and damage the tape which is drawn out of the miniature type tape cassette, and make it impossible to carry out the tape loading and tape unloading operations within the adapter.

SUMMARY OF THE INVENTION

Accordingly, it is a general object of the present invention to provide a novel and useful adapter for a miniature type tape cassette, in which the above described disadvantages have been overcome.

Another and more specific object of the present invention is to provide an adapter for a miniature type tape cassette, which is provided with lid stopping means for stopping a lower surface of an open lid of a miniature type tape cassette accommodated within an accommodating part of the adapter, so that the lid will not rotate towards the lid closing direction even if a force in the lid closing direction acts on the lid. According to the adapter of the present invention, the lid of the miniature type tape cassette will not close even if the user pushes the lid by his finger. As a result, it is possible to provide positive protection of the tape, and normally carry out tape loading and tape unloading operations within the adapter.

Other objects and further features of the present invention will be apparent from the following detailed description when read in conjunction with the accompanying drawings.

BRIEF DESCRIPTION OF THE DRAWINGS

FIGS. 2A, 2B, 2C, and 2D respectively show a plan view, a side view, a bottom view, and a rear view of the miniature type tape cassette shown in FIG. 1;

FIG. 3 is a plan view showing the inner construction of the miniature type tape cassette shown in FIG. 1 in a state where an upper half of a cassette case and an upper flange of a reel are removed;

FIG. 4 shows a cross section taken along a line IV—IV in FIG. 2A;

FIG. 7 is a plan view showing the adapter shown in FIG. 5 together with a lid opening and closing mechanism, in a state where a cover at the rear of the adapter is open;

FIG. 8 is a side view showing the adapter shown in FIG. 7;

DETAILED DESCRIPTION

Figure 1:
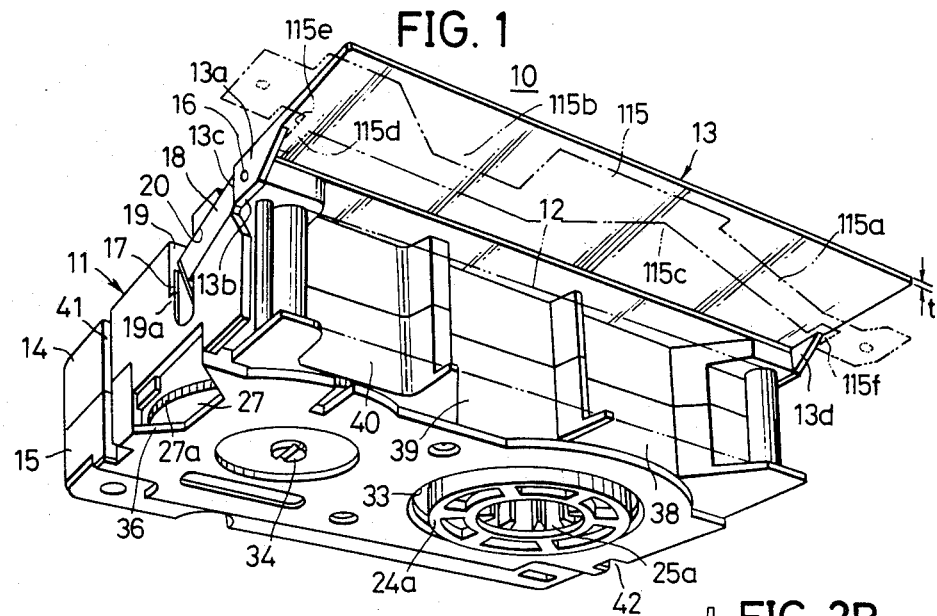
FIG. 1 is a perspective view showing an example of a miniature type tape cassette which is accommodated within an adapter for a miniature type tape cassette according to the present invention, in a state where a tape protecting lid is open, viewed from a lower direction with respect to the front of the miniature type tape cassette.
Figure 2A:
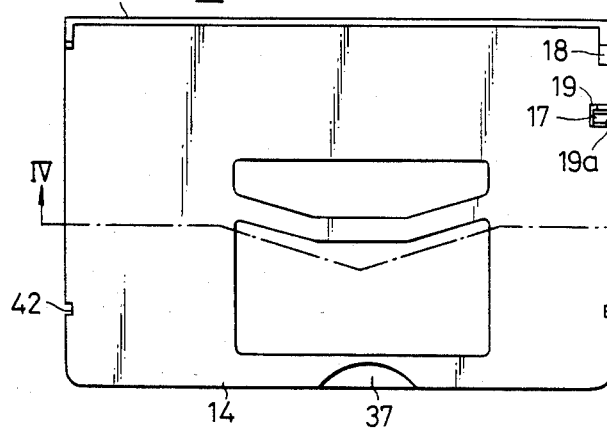
Figure 2B:
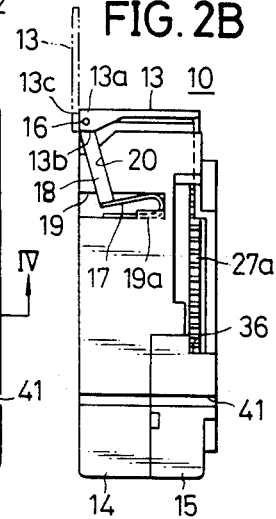
Figure 2D:
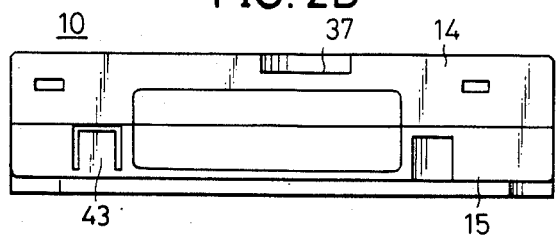

First, description will be given with respect to a miniature type tape cassette which can be applied to an adapter for a miniature type tape cassette according to the present invention.

A miniature type tape cassette 10 is shown in FIGS. 1, 2A through 2D, 3, and 4. The tape cassette 10 has a cassette case 11 of a size smaller than a standard type tape cassette which is primarily designed for a standard type recording and/or reproducing apparatus. A lid 13 for protecting a magnetic tape 12 accommodated within the tape cassette 10, is provided on the front of the cassette case 11. The cassette case 11 consists of an upper half 14 and a lower half 15.

A part of a rectangular-shaped side flange part 13a of the lid 13 is axially supported by a hinge pin 16 in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a vertical closed state shown in FIG. 2B. Further, in another state, another side edge 13c of the flange part 13a is pushed by the slide rod 18, and the lid 13 is in a horizontal open state shown in FIG. 1 and as indicated by a two-dot chain line in FIG. 2B. The lid 13 is maintained in the closed or open state, due to the force exerted by the leaf spring 17. The lead spring 17 is fitted into a side groove 19 of the upper half 14, in a state where the leaf spring 17 is held by a projecting rib 19a and does not easily separate from the side groove 19. The side rod 18 is provided within a groove 20 at the side of the upper half 14, in a freely slidable manner. Moreover, when the tape cassette 10 is not loaded into a recording and/or reproducing apparatus exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

In addition, as shown in FIGS. 3 and 4, a supply reel 21 and a take-up reel 22 are provided side by side within the cassette case 11. A distance D between centers of the reels 21 and 22 is shorter than the distance between centers of supply and take-up reels of a standard type tape cassette designed for a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front of the cassette case 11, to form a tape path 12A reaching the take-up reel 22.

The supply reel 21 is provided in a state where an annular projection step portion 24a of the lower flange 24 is loosely fitted into a hole 33 having a large diameter on the lower half 15.

The take-up reel 22 is provided in a rotatable manner such that a fixed shaft 35 fixed to the lower half 15 by a screw 34 is inserted into a center hole of the reel hub 28.

In addition, gear teeth 27a are formed on the entire peripheral part of the lower flange 27 of the take-up reel 22. As shown in FIGS. 1, 2B, 2C, 3, and 4, a part of the peripheral part of the lower flange 27 is exposed through a cutout window 36 formed at a part between the side surface and the bottom surface of the lower half 15.

Further, a depressed step part 37 having a substantially semi-circular shape in the plan view, is formed at a central top part in the upper surface of the tape cassette 10 extending to the rear. This depressed step part 37 engages with an engaging lever provided on the tape cassette adapter, as will be described hereinafter.

The miniature type tape cassette 10 has cutouts 38, 39, and 40 at the front thereof, and grooves 41 and 42 at the right and left side walls thereof. Moreover, an erroneous erasure preventing tab 43 is provided at the rear of the tape cassette 10.

Next, description will be given for a case where an adapter for a miniature type tape cassette according to the present invention is loaded into the standard type recording and/or reproducing apparatus in a state accommodating the tape cassette 10 having the above described construction, by referring to FIGS. 5 through 9B.

Figure 5:
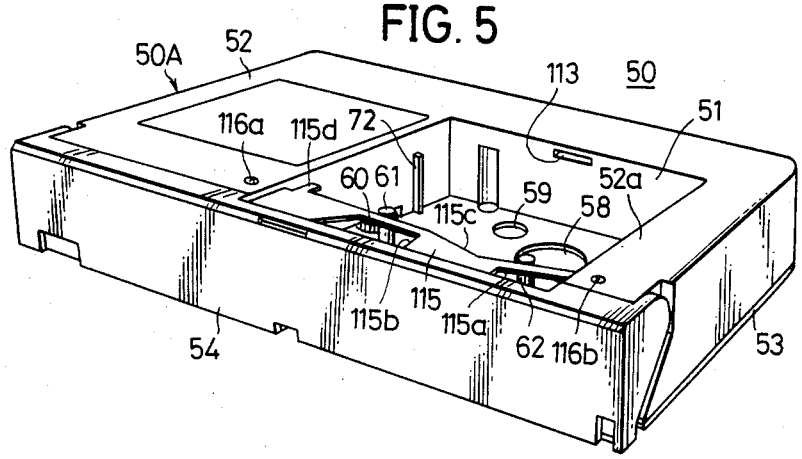
FIG. 5 is a perspective view showing an embodiment of an adapter for a miniature type tape cassette according to the present invention.

An adapter 50 has an accommodating part 51 for accommodating the tape cassette 10 within an adapter case 50A as shown in FIG. 5, and the adapter case 50A has an external form and size substantially equal to those of the standard type tape cassette. The adapter case 50A consists of a case body 52 having a top plate part and side wall parts, a bottom plate 53, and a lid 54. The lid 54 is free to open and close, and is provided at the front of the adapter case 50A. As will be described hereinafter, the lid 54 protects the magnetic tape which forms a predetermined tape path within the adapter 50.

Figure 6:
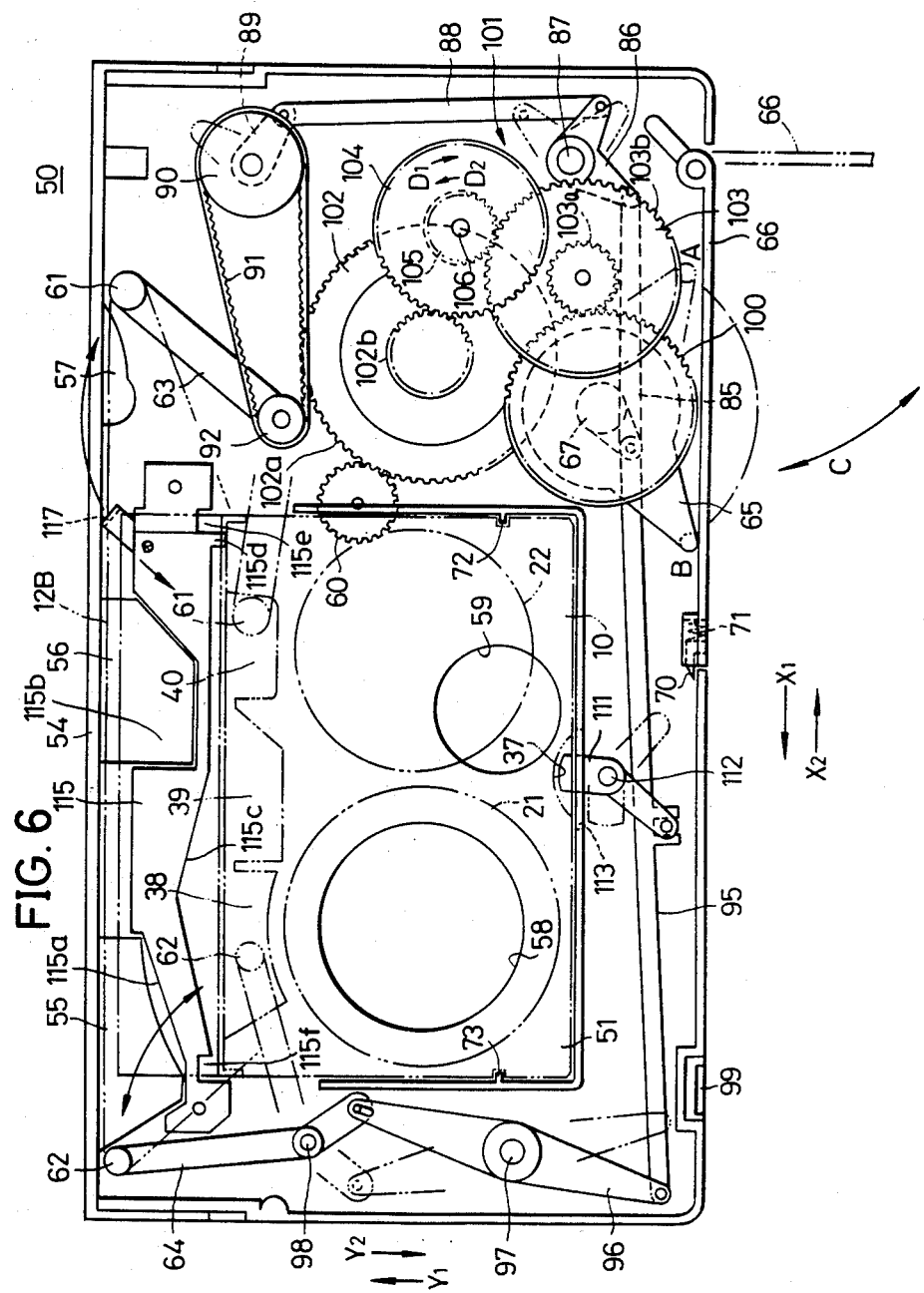
FIG. 6 is a plan view showing a mechanism for drawing out a tape within the adapter shown in FIG. 5 in a state where a top plate of the adapter is removed.

A mechanism for drawing out the tape and a rotation transmitting mechanism for taking up the tape, respectively shown in FIG. 6, and a mechanism for opening and closing the lid, shown in FIG. 7, are provided within the adapter case 50A. Cutouts 55 and 56 into which loading poles enter, and a cutout 57 into which a capstan enters, are respectively provided at the front of the bottom plate 53.

The accommodating part 51 is formed as a depression having an opening at the upper part thereof. A reel driving shaft inserting hole 58 and a cassette push-out hole 59 are provided on the bottom part of the accommodating part 51. Furthermore, a reel driving gear 60 partly projects into the accommodating part 51 from a side of the accommodating part 51.

Poles (or rollers) 61 and 62 for drawing out and guiding the tape are respectively embedded at the ends of a first loading arm 63 and a second loading arm 64. These poles 61 and 62 move between positions indicated by two-dot chain lines in FIG. 6 (solid lines in FIG. 7) before the tape is drawn out, and positions indicated by solid lines in FIG. 6 (two-dot chain lines in FIG. 7) after the operation drawing out the tape is completed. Before the tape is pulled out, the poles 61 and 62 are positioned within the accommodating part 51, and are at positions opposing the cutouts 40 and 38 of the tape cassette which is accommodated within the adapter 50. After the operation of drawing out the tape is completed, the poles 61 and 62 respectively are at positions corresponding to positions of right and left tape guide poles provided at the front of the standard type tape cassette, to guide the tape. The poles 61 and 62 simultaneously move between the above two positions, by rotationally manipulating a manipulation lever 65 provided at the rear of the adapter case 50A between a non-operational position A and an operation completed position B about a shaft 67.

A hinged cover 66 is provided at the rear of the adapter case 50A, so that the cover 66 is free to open and close along an arrow C. As will be described hereinafter, the lid 54 is opened and closed in response to the opening and closing of the above cover 66. The cover 66 is provided at a position opposing the manipulation lever 65.

A locking mechanism consisting of a finger 70 and a spring 71 is provided at the tip end of the cover 66, to lock the cover 66 in the closed state as shown in FIG. 6. A rotary free end 68 of the lever 65 makes contact with the rear surface of the cover 66, to lock the lever 65 at either the above position A or B.

Figure 9A:
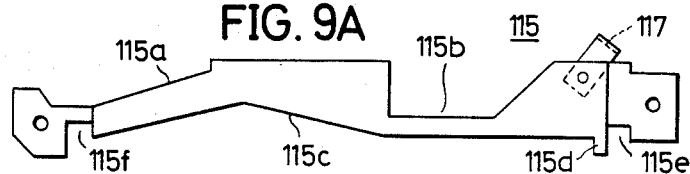
FIGS. 9A and 9B are a plan view and a front view respectively showing a lid stopping member.
Figure 9B:
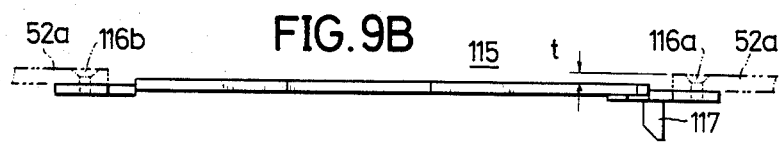

FIG. 9A and 9B show a stopping member 115 which constitutes an essential part of the present invention. The stopping member 115 is a member punched out from an aluminum plate. Right and left ends of the stopping member 115 are respectively fixed onto the lower surface of a top plate 52a of the case body 52 by screws 116a and 116b. Hence, as will be described hereinafter, the stopping member 115 is provided at a position closer to the lid 54 in the accommodating part 51, so that the stopping member 115 opposes the lower surface of the open lid 13 when the tape cassette 10 is accommodated within the adapter 50. Moreover, if the height position of this stopping member 115 is observed, the stopping member 115 is at a height position lower than the upper surface of the adapter case 50A by a thickness t of the lid 13.

In addition, cutouts 115a and 115b substantially corresponding to the cutouts 55 and 56 into which the loading poles enter, are formed on one side of the stopping member 115 along the longitudinal direction thereof. On the other hand, a cutout 115c extending for substantially the entire length of the stopping member 115 is formed on the other side of the stopping member 115 along the longitudinal direction thereof. Further, a projection 115d is formed in the vicinity of the right end of the stopping member 115 and small cutouts 115e and 115f are formed on the right and left ends of the stopping member 115, respectively on this other side of the stopping member 115.

The stopping member 115 itself can be resiliently deformed. A resilient tape path restricting piece 117 for restricting the tape path, hangs from the stopping member 115 at a position coinciding with the moving locus of the pole 61, near a tape path 12B formed between the poles 61 and 62 and the cutout 56.

The stopping member 115 may be provided as a part of the case body 52.

Next, description will be given with respect to the operation in which the tape cassette 10 is accommodated within the accommodating part 51 of the adapter 50, to form the predetermined tape path within the adapter 50.

When accommodating the tape cassette 10 within the adapter 50, a cover (not shown) covering the top of the accommodating part 51 of the adapter 50 is opened. The tape cassette 10 is accommodated within the accommodating part 51, in a state where the lid 13 is open and the magnetic tape 12 is not drawn out, by pushing down the tape cassette 10 into the adapter 50. The tape cassette 10 is accommodated facing a predetermined direction, by fitting the grooves 41 and 42 provided on the side of the tape cassette over corresponding projecting ribs 72 and 73 provided at the accommodating part 51. By the above operation to accommodate the tape cassette 10 within the adapter 50, The poles 61 and 62 are respectively and relatively inserted into the cutouts 40 and 38 of the tape cassette 10 on the inner side of the tape path 12A, so as to oppose the tape path 12A. Moreover, the gear teeth 27a meshes with the gear 60. After the tape cassette 10 is accommodated within the accommodating part 51, the cover (not shown) covering the top of the accommodating part 51 is closed so as to cover the top of the accommodated cassette case 11.

In the state where the tape cassette 10 is accommodated within the adapter 50, the top surface of the lid 13 coincides with the upper surface of the adapter case 50A, and the lower surface of the lid 13 is stopped and supported by the stopping member 115 as shown in FIGS. 1, 6, and 7. Accordingly, when thereafter handling the adapter or loading the adapter into the recording and/or reproducing apparatus, for example, the lid 13 is stopped from closing by the stopping member 115 even if an external force acts on the lid 13 towards the closing direction of the lid 13. That is, the lid 13 is prevented from closing by the stopping member 115 and maintained in the open state.

In addition, the side flange parts 13a and 13d of the lid 13 respectively are within the small cutouts 115e and 115f of the stopping member 115 in this state. These small cutouts 115e and 115f may be used for positioning the tape cassette 10 accommodated within the accommodating part 51, near the lid 13 along the right and left sides thereof.

In the above described state, the cover 66 of the adapter case 50A is opened, the lever 65 is rotationally manipulated to the position B, and the cover 66 is closed. By these series of operations, the magnetic tape 12 is drawn out of the tape cassette 10, to form the predetermined tape path 12B within the adapter case 50A.

In detail, as shown in FIGS. 7 and 8, when the cover 66 is rotated counterclockwise about a shaft 75 by an angle of approximately ninety degrees, a lever 76 slides in the direction of an arrow X1. Moreover, an L-shaped lever 77 rotates clockwise about a pin 78 to push a lever 79 in the direction of an arrow Y1. The tip end of the lever 79 is linked to an arm 81 which is fixed to a shaft 80 of the opening and closing lid 54. By the above described movement of the lever 79, the lid 54 opens halfway as shown especially in FIG. 8.

In the above state, the lever 65 is rotated clockwise to the position B indicated by the solid line in FIG. 6, from the position A indicated by the two-dot chain line in FIG. 6. By this clockwise rotation of the lever 65, a connector 85 moves in the direction of the arrow X1. Thus, an L-shaped rotary lever 86 rotates clockwise about a shaft 87, a connector 88 moves in the direction of an arrow Y2, and a lever 89 rotates clockwise. A timing gear 90 rotates unitarily with the lever 89. By the above rotation of the gear 90, a timing gear 92 is rotated clockwise with a timing belt 91, and the first loading arm 63 rotates unitarily with the gear 92 clockwise to a position indicated by a solid line in FIG. 6. Further, by the above operation of the lever 65, a connector 95 moves in the direction of the arrow X1, a rotary lever 96 rotates about a shaft 97 clockwise. When the rotary lever 96 rotates, the second loading arm 64 rotates counterclockwise about a shaft 98 to a position indicated by the solid line in FIG. 6.

Figure 12:
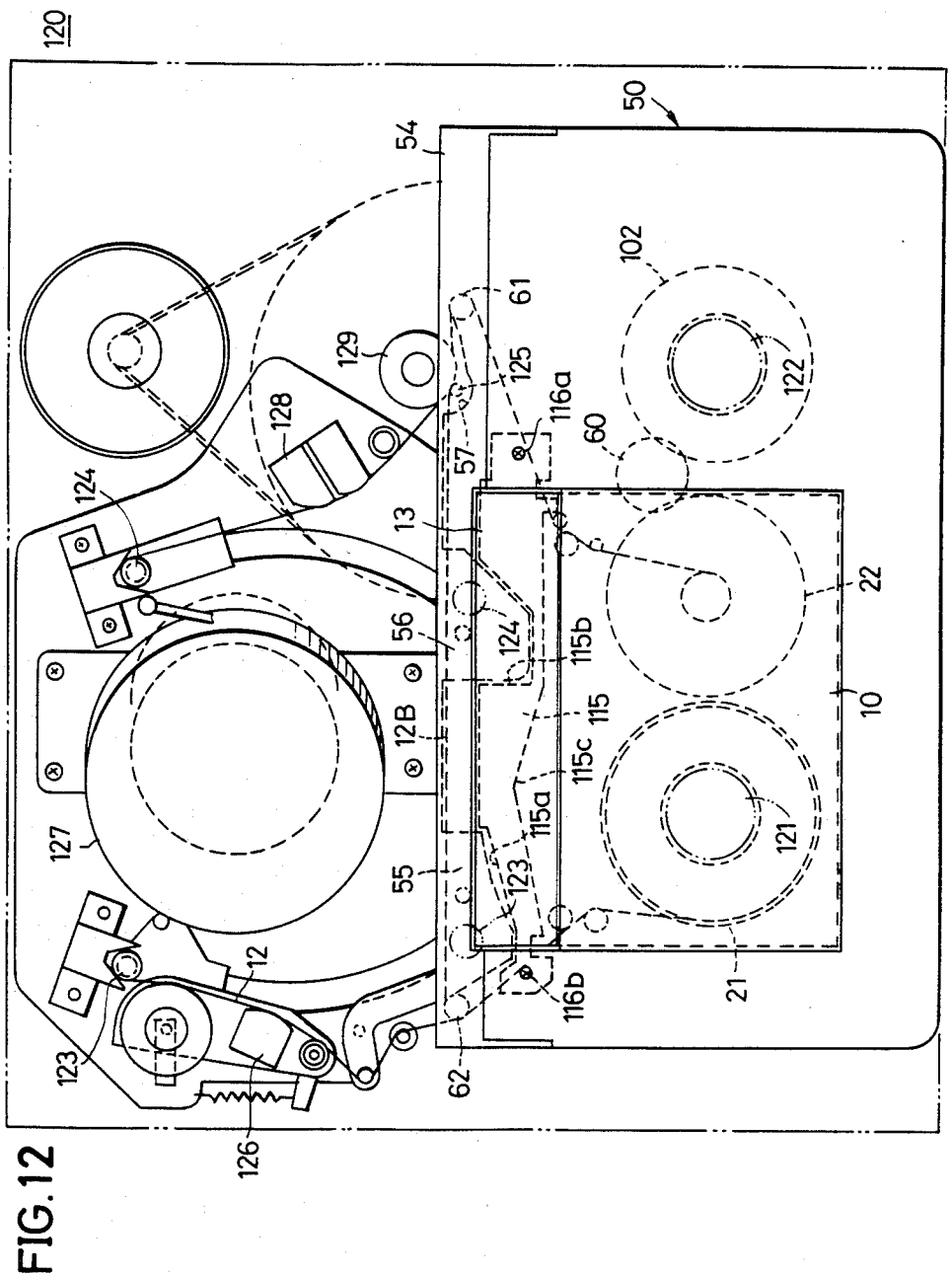
FIG. 12 is a plan view showing an example of a standard type recording and/or reproducing apparatus loaded with the adapter for a miniature type tape cassette shown in FIG. 5, in a state where the miniature type tape cassette shown in FIG. 1 is accommodated within the adapter, during a recording or reproducing mode.

By the rotation of the first and second loading arms 63 and 64, the poles 61 and 62 intercept and engage with the magnetic tape 12 to draw the magnetic tape 12 out of the tape cassette 10. These poles 61 and 62 reach positions indicated by solid lines in FIG. 6 whereat the operation of drawing out the magnetic tape 12 is completed. The magnetic tape 12 is drawn out from the reels 21 and 22 of the tape cassette 10, to form the predetermined tape path 12B, guided by the poles 61 and 62, as shown in FIG. 12. The positions of the poles 61 and 62 whereat the operation of drawing out the magnetic tape is completed, correspond to positions of right and left guide poles provided at the front of the standard type tape cassette. In addition, the tape path 12B which is formed by the guidance provided by the poles 61 and 62 becomes identical to the tape path formed at the front of the standard type tape cassette. When the adapter 50 is used, the poles 61 and 62 act as guides to guide the magnetic tape 12.

The cover 66 is rotated clockwise, to close as shown in FIG. 6. In relation with the closing operation of the cover 66, the lever 76 moves in the direction of an arrow X2 to move away from the lever 77. Accordingly, the lever 79 moves in the direction of the arrow Y2 due to the action of a spring (not shown), to close the lid 54. The cover 66 is locked at the closed state. The adapter 50 is loaded into the standard type recording and/or reproducing apparatus which will be described hereinafter, in this state.

When the tape cassette 10 is to be extracted from the adapter 50, the cover 66 is opened, the lever 65 is rotated counterclockwise to return to the original position A, and then, the cover 66 is closed.

By the operation of the manipulation lever 65 in particular, the loading arms 63 and 64 respectively rotate counterclockwise and clockwise. Moreover, the poles 61 and 62 respectively return into the cutouts 40 and 38 of the tape cassette 10 which is accommodated within the accommodating part 51.

In addition, by the above operation of the lever 65, the rotation of a gear 100 which is unitarily provided with the lever 65, is transmitted to a gear structure 102 through a gear mechanism 101. Further, the above rotation is transmitted to the take-up reel 22 within the tape cassette 10, through the gear 60 which meshes with a gear part 102a of the gear structure 102. Accordingly, the take-up reel 22 is rotated clockwise, to take up the magnetic tape 12 which was drawn outside the tape cassette 10.

Hence, by the operation of the lever 65, the entire magnetic tape 12 drawn outside the tape cassette 10 is retracted into the tape cassette 10. The tape cassette 10 can be extracted from the accommodating part 51 by inserting the user's finger tip into the hole 59 and pushing the bottom of the tape cassette 10 upwards. Even if there is slack in the tape path 12A and the magnetic tape 12 slightly projects in front of the cassette case 11, the tape path 12A in front of the cassette case 11 is not obstructed by the stopping member 115, and the magnetic tape 12 can freely pass within the cutout 115c. Thus, the tape cassette 10 can be extracted from the adapter 50 in a normal state.

The gear mechanism 101 consists of a gear structure 103, a large-diameter gear 104, and a small-diameter gear 105. The above gear structure 103 has a small-diameter gear part 103a which meshes with the gear 100, and a large-diameter gear part 103b which meshes with the small-diameter gear 105. The large-diameter gear 104 meshes with a vertex gear part 102b of the gear structure 102, and is coaxially provided with the small-diameter gear 105 in a state axially supported by a shaft 106. A uni-directional clutch is provided between the large-diameter gear 104 and the small-diameter gear 105.

As shown in FIG. 6, the adapter 50 has an erroneous erasure preventing tab 99 which is removable, at a position corresponding to the position of the erroneous erasure preventing tab of the standard type tape cassette. In addition, in the state where the tape cassette 10 is accommodated within the adapter 50, the supply reel 21 and the gear structure 102 respectively are at positions corresponding to the positions of the supply reel and the take-up reel of the standard type tape cassette.

If the tape cassette 10 is accommodated within the adapter 50 in a state where the lid 13 is closed, the tape loading operation within the adapter 50 cannot be carried out in a normal manner. Hence, in the present embodiment, if an attempt is made to accommodate the tape cassette 10 in the adapter 50 in the state where the lid 13 is closed, a part P of the lower end of the lid 13 shown in FIG. 2C hits the projection 115d of the stopping member 115, and the tape cassette 10 is prevented from being accommodated within the accommodating part 51 in the state where the lid 13 is closed.

Next, description will be given with respect to the construction and effects of the resilient tape path restricting piece 117, by referring to FIGS. 10 and 11.

Figure 10:
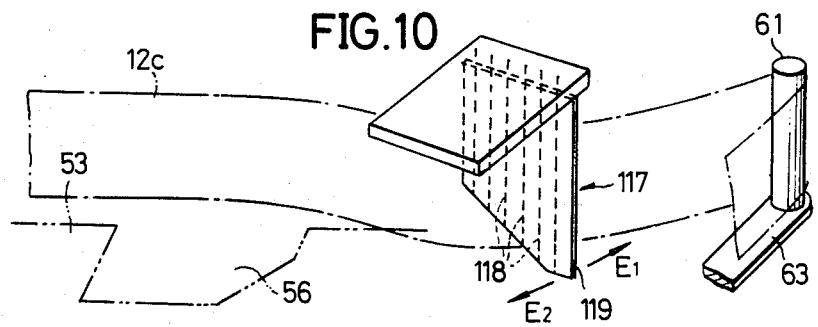
FIGS. 10 and 11 are a perspective view and a plan view respectively showing the lid stopping member, for explaining the function of a resilient tape path restricting piece.
Figure 11:
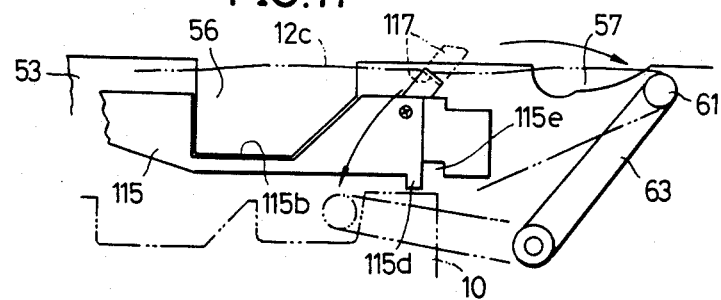

As shown in FIG. 10, the resilient tape path restricting piece 117 comprises an arm part which is screwed onto the stopping member 115 and a hanging part which hangs from the arm part. This hanging part of the resilient piece 117 comprises a plurality of fine metal wires 118 embeddedly arranged in a row in the arm part, and a polyethylene terephthalate films 119 adhered onto the metal wires 118 so as to sandwich the metal wires 118. The resilient piece 117 can easily undergo resilient deformation along the directions of arrows E1 and E2, to a substantially horizontal state. The resilient piece 17 is arranged so as to be substantially perpendicular to the moving path of the pole 61 as indicated by an arrow in FIG. 11. During the tape loading operation within the adapter 50, the resilient piece 117 engages with the pole 61 and is bent in the direction of the arrow E1 up to the substantially horizontal state, and the resilient piece 117 engages with the pole 61 and is bent in the direction of the arrow E2 up to the substantially horizontal state during the tape unloading operation within the adapter 50. After the pole 61 engages with the resilient piece 117 and passes by the resilient piece 117, the resilient piece 117 returns to its original hanging state from the substantially horizontal state, so as to engage with the magnetic tape which is slacked and form a tape path closely approximating the normal tape path 12B as will be described hereinafter. A maximum bent state of the resilient piece 117 upon tape loading operation within the adapter 50, is indicated by a two-dot chain line in FIG. 11. In addition, because the metal wires 118 act as a resilient core of the resilient piece 117, the resilient piece 117 can normally return to its hanging state where the resilient piece 117 can engage with the magnetic tape 12, even after the adapter 50 is used for a long period of time.

For example, if the above manipulation lever 65 is forced to assume the position B, the magnetic tape 12 will be forced to be drawn outside the tape cassette 10. In this case, the reels will undergo slight rotation due to inertia, and the tape path formed between the poles 61 and 62 may become slacked. However, the slacked magnetic tape 12 will engage with the resilient piece 117 as shown in FIGS. 10 and 11, and as a result, a tape path 12C is formed where the slacked magnetic tape 12 is restricted from entering into the cutout 56. As will be described hereinafter, when the adapter 50 is loaded into the standard type recording and/or reproducing apparatus, the loading pole enters into the inner side of the tape path 12C in a normal manner.

The lower end of the hanging part of the resilient piece 117 is obliquely cut so as not to intercept the magnetic tape 12 when the resilient piece 117 returns to its original state during the tape loading operation within the adapter 50.

In addition, another resilient piece may be provided at the other cutout 55, so that the separately provided resilient piece engages with the slacked magnetic tape and forms a tape path in order to restrict the slacked magnetic tape from entering within the cutout 55.

As shown in FIG. 12, the adapter 50 accommodating the tape cassette 10 is loaded into a standard type recording and/or reproducing apparatus 120, similarly as in the case where the standard type tape cassette is loaded.

That is, by loading the adapter 50, a supply reel driving shaft 121 is inserted into a reel driving shaft inserting part 25a of the supply reel 21 of the tape cassette 10. On the other hand, a take-up reel driving shaft 122 is inserted into a reel driving shaft inserting part of the gear structure 102 within the adapter 50. In addition, loading poles 123 and 124 and a capstan 125 respectively enter into the cutouts 55, 56, and 57. The vertex parts of the loading poles 123 and 124 enter within the cutouts 115a and 115b without hitting against the stopping member 115.

Upon a tape loading operation, the above loading poles 123 and 124 respectively intercept and engage with the magnetic tape 12, then drawn the magnetic tape 12 out of the cassette, and reach positions indicated by solid lines in FIG. 12. Accordingly, the magnetic tape 12 which is drawn outside the adapter 50, makes contact with a full-width erasing head 126, and makes contact with a guide drum 127 provided with rotary video heads over a predetermined angular range. The magnetic tape 12 further makes contact with an audio and control head 128. Therefore, the above magnetic tape 12 is loaded onto a predetermined tape path. The magnetic tape 12 is driven in a state pinched between the capstan 125 and a pinch roller 129. Moreover, the gear structure 102 within the adapter 50 is rotated clockwise by the take-up reel driving shaft 122. This rotation of the gear structure 102 is transmitted to the take-up reel 22 through the gear 60, to drive the magnetic tape 12 towards a tape take-up direction. Accordingly, the magnetic tape 12 fed out by the capstan 125 is taken up by the take-up reel 22. The magnetic tape 12 is guided by the pole 62 at the exit part of the adapter 50, and guided by the pole 61 at the entrance part of the adapter 50.

Among the standard type recording and/or reproducing apparatuses, there are apparatuses employing tape cassette loading mechanisms of the so-called front-loading type which allows insertion of the standard type tape cassette from the front of the apparatus. In this type of a tape cassette loading mechanism, a pair of rollers which push against the top of the tape cassette are provided on the right and left sides of the tape cassette loading mechanism. The pair of rollers relatively roll over the top of the tape cassette, to pull the tape cassette into the apparatus upon loading of the tape cassette and to push the tape cassette out of the apparatus upon unloading of the tape cassette.

If the adapter 50 described heretofore is loaded into the standard type recording and/or reproducing apparatus employing the front-loading type tape cassette loading mechanism, one of the pair of rollers will push against and roll over the open lid 13 of the tape cassette 10 which is accommodated within the adapter 50. Hence, the central part of the lid 13 with respect to the longitudinal direction thereof, will be pushed by this one roller as the roller rolls over the open lid 13. If the central part of the lid 13 is not stopped and only the right and left ends thereof are stopped and supported, the central part of the lid 13 will become deformed. However, according to the adapter 50, the central part of the lid 13 is stopped by the stopping member 115 and will not undergo resilient deformation due to this push by the roller of the tape cassette loading mechanism. As a result, the lid 13 remains flat without being bent. Therefore, although the pulling force exerted by the roller will change if the lid 13 bends as the roller rolls over the lid 13, the pulling force exerted by the roller with respect to the adapter 50 according to the present invention does not change even when the roller rolls over above the lid 13, and the adapter 50 can be pulled within the apparatus in a normal manner without being pulled unevenly.

In the above embodiment, the stopping member 115 is designed to stop the entire open lid 13 of the tape cassette 10 accommodated within the adapter 50, along the longitudinal direction of the lid 13. However, the stopping member may be shaped to have a special shape, so that only the central part of the lid 13 will be stopped with respect to the longitudinal direction of the lid 13. Similar effects as those obtained in the embodiment described heretofore may be obtained in this case.

Further, the present invention is not limited to these embodiments, but various variations and modifications may be made without departing from the scope of the present invention.

What is claimed is:

1. An adapter for a miniature type tape cassette having an external form and size smaller than those of a standard type tape cassette, said miniature type tape cassette being used with a recording and/or reproducing apparatus of a type different from a standard type recording and/or reproducing apparatus primarily designed for performing recording and/or reproduction with said standard type tape cassette, said miniature type tape cassette comprising a cassette case smaller than said standard type tape cassette, a tape accommodated within said cassette case and forming a tape path along a front of said cassette case when said miniature type tape cassette is not used, and a lid provided at the front of said cassette case in a state free to open and close, and covering the tape forming said tape path in front of said cassette case in its closed state, said lid being open in a state where said miniature type tape cassette is accommodated within said adapter, said adapter comprising:
an adapter case having an external form and size substantially identical to those of said standard type tape cassette;
an accommodating part for accommodating said miniature type tape cassette;
tape draw-out means provided within said adapter case, for drawing out the tape from said miniature type tape cassette so as to form a predetermined tape path within said adapter case; and
lid stopping means for stopping a lower surface of said open lid of said miniature type tape cassette accommodated within said accommodating part, at least at a substantially central part along a longitudinal direction of said lid.

2. An adapter as claimed in claim 1 in which said lid stopping means is a lid stopping member provided across an opening of said adapter case into which said open lid of said miniature type tape cassette accommodated within said accommodating part enters, and said lid stopping member comprises a part for stopping and supporting the lower surface of said lid at least at the substantially central part along the longitudinal direction of said lid.

3. An adapter as claimed in claim 2 in which said lid stopping member is fixedly screwed onto a lower surface of a top plate of said cassette case, and an upper surface of said lid stopping member is lower than an upper surface of said top plate of said cassette case by a length corresponding to the thickness of said lid.

4. An adapter as claimed in claim 2 in which said lid stopping member comprises a projection for permitting accommodation of said miniature type tape cassette within said accommodating part in a state where said lid is open, and restricting accommodation of said miniature type tape cassette within said accommodating part in a state where said lid is closed by making contact with a lower end edge of said closed lid.

5. An adapter as claimed in claim 2 in which said adapter case comprises cutouts into which tape loading poles of said standard type recording and/or reproducing apparatus enter, and said lid stopping member comprises cutouts substantially coinciding with said cutouts of said adapter case in a plan view viewed from above said adapter.

6. An adapter as claimed in claim 5 in which said lid stopping member comprises a resilient tape path restricting piece provided in a hanging manner within a moving locus of said tape draw-out means, and said resilient tape path restricting piece engages with said tape draw-out means and is bent when said tape draw-out means passes by said resilient tape path restricting piece to permit operation of said tape draw-out means, and resiliently returns to its original substantially vertical state after said tape draw-out means passes by so as to assume a state where said resilient tape path restricting means can intercept said tape in order to prevent said tape from entering within the cutout of said adapter case when there is slack in the tape path formed at the front of said miniature type tape cassette by said tape draw-out means.

7. An adapter as claimed in claim 6 in which said resilient tape path restricting piece comprises a plurality of fine metal wires as its core.

8. An adapter as claimed in claim 6 in which said resilient tape path restricting piece comprises a plurality of fine metal wires as its core, and said metal wires are covered by polyethylene terephthalate films.

9. An adapter as claimed in claim 6 in which said resilient tape path restricting piece comprises an oblique cut at a lower end thereof so that the lower end of said resilient tape path restricting piece does not intercept the tape path formed by said tape draw-out means when said resilient tape path restricting piece returns to its substantially vertical state.

10. An adapter as claimed in claim 2 in which said lid stopping member comprises a cutout extending for substantially the entire length of said lid stopping member at a side thereof nearer said accommodating part, and said cutout permits a tape path formed at the front of said miniature type tape cassette to pass therethrough when extracting said miniature type tape cassette from said adapter even when the tape path formed at the front of said miniature type tape cassette projects frontwards of said cassette case from a predetermined tape path.

* * * * *